Feb. 6, 1945.   B. R. PURVIN   2,368,877
TAILSTOCK CLAMP
Filed July 3, 1940
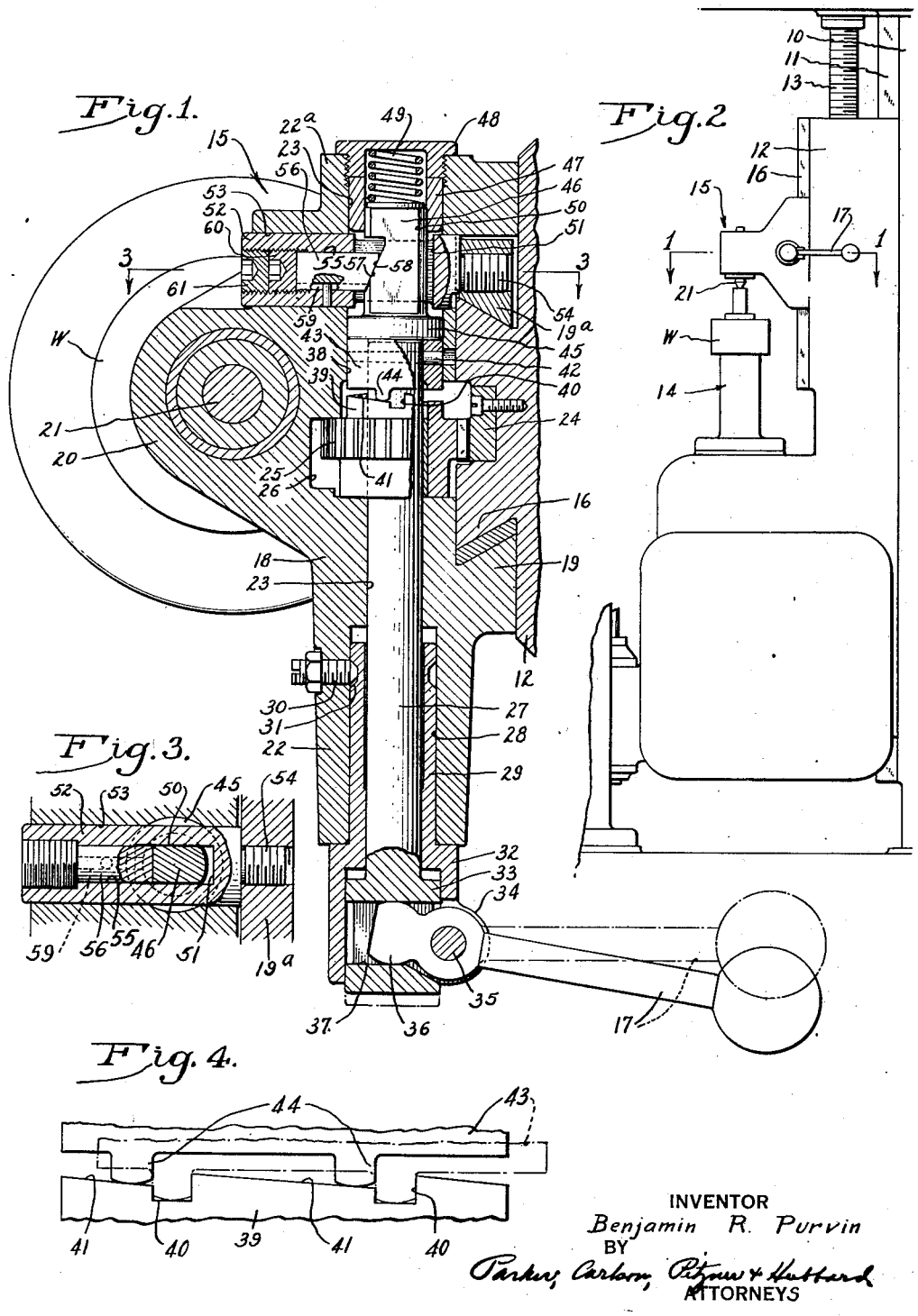
INVENTOR
Benjamin R. Purvin
BY
ATTORNEYS Patented Feb. 6, 1945

2,368,877

UNITED STATES PATENT OFFICE 2,368,877

TAILSTOCK CLAMP

Benjamin R. Purvin, Rockford, Ill., assignor to Barber-Colman Company, Rockford, Ill., a corporation of Illinois Application July 3, 1940, Serial No. 343,729

6 Claims. (Cl. 90—23)

The invention relates to clamping devices for the tailstock of a machine tool and the general aim thereof is to provide a simple, efficient device of this nature which is convenient to operate.

An object of the invention is to provide a novel tailstock clamp so associated with a rotatable means for shifting the position of the tailstock that an initial rotary movement of said means releases the clamp and a final rotary movement thereof actuates the clamp.

More specifically stated, an object is to provide a new and improved tailstock clamp including a rotary member, which may be a part of the actuating means for adjusting the position of the tailstock, and cam actuated wedging means operable by certain rotary movements of said member to secure or release the tailstock.

Other objects and advantages will become apparent in the following description and from the accompanying drawing, in which:

Figure 1 is a sectional view through a tailstock assembly embodying the features of the invention and is taken along the line 1—1 of Fig. 2.

Fig. 2 is a view in front elevation on a reduced scale of the tailstock assembly in a machine tool.

Fig. 3 is a sectional view of a structural detail taken along the line 3—3 of Fig. 1.

Fig. 4 is an extended diagrammatic illustration of the cam actuating means.

In the drawing, an exemplary embodiment of the invention is shown for illustrative purposes in connection with a machine tool of the type disclosed in my copending application Serial No. 317,166, filed February 3, 1940 (Patent No. 2,338,738). This machine tool includes an upright 10 having vertical ways 11 for guiding the reciprocatory movements of a work slide 12 produced by a feed screw 13. A work blank W is operatively secured to a rotatable driving spindle assembly 14 by a tailstock 15 slidably adjustable along vertical ways 16 on the work slide. The means for adjusting and clamping the tailstock are, as will become apparent, actuated by a handle or lever 17.

Referring to Fig. 1, the tailstock structure includes a head 18 having guides 19, 19ª complemental to and engaging the ways 16 on the work slide and having an outwardly or forwardly extending boss 20 in which a center 21 is mounted. One guide (in this instance the upper one 19ª as seen in Fig. 1) is movable, or includes a section which is movable, into and out of binding engagement with the way associated therewith.

Axially alined projections 22, 22ª extend laterally from opposite sides of the head between the ways 19 and boss 20, and a continuous bore 23 is formed in the projections and in the intermediate part of the head.

Secured to the work slide between and paralleling the ways 16 thereon is a rack 24 for engagement by a pinion 25 located in an internal recess 26 in the head. The pinion is loosely mounted on an actuating shaft 27 and the side walls of the recess abut the end faces of the pinion to hold it against axial movement. The shaft is rotatable in the bore 23 and extends toward the front of the machine beyond the end of the projection 22. The outer end of the bore 23 in the projection 22 is of enlarged diameter, as indicated at 28, to receive a sleeve 29 which encircles the outer end of the shaft and is suitably fixed for rotational but nonaxial movement by a pin 30 on the projection 22 engaging an annular groove 31 in the sleeve. The outer ends of the sleeve and the shaft are enlarged, as at 32, 33 respectively, and spaced radial ears 34 on the sleeve enlargement support the handle or lever 17 through a pivot 35 extending transversely of the shaft axis. A short arm 36 extends, as a continuation of the handle, into a slot 37 in the enlargement 33 of the shaft, the arrangement being such that rotary and limited axial movements may be imparted to the shaft by movement of the handle respectively about the axis of the shaft and about its pivot.

The clamping means is actuated by rotation of the shaft 27 and includes clamping elements which are adapted to be released or engaged by the initial or final rotary movements of the shaft preparatory to or following an adjustment of the tailstock. Such initial and final shaft movements also effect a driving engagement or disengagement between the shaft and the pinion 25. In the present embodiment, the clamping elements are coacting cam means actuated by relative rotary movement between the shaft and pinion to produce an endwise movement of a clamping wedge member into or out of a wedged, clamped engagement with a cooperating member.

As shown in Fig. 1, the bore 23 from the recess 26 through the projection 22ª is enlarged and this portion of the bore is designated 38. An end flange 39 on the pinion extends into the enlarged bore and has an end face provided with diametrically located notches 40. Between each of the notches the end face is formed on a spiral angle to provide rising cam faces designated 41 (see Fig. 4). Pinned, as at 42, to the inner end of the shaft 27 is a collar 43 fitting snugly and rotatably in the bore enlargement 38. The collar adjoins the pinion flange 39 and has diametrical, axially extending nibs or lugs 44 provided with rounded or somewhat arcuate end faces. The lugs are adapted to seat in the flange notches 40 to establish a driving connection between the shaft and the pinion or to ride over the cam faces to impart axial movement to the shaft 27 and collar 43.

Slidably mounted in the bore enlargement 38 adjacent the end of the shaft and collar is a head 45 on the end of an elongated wedge rod 46 that extends axially of the bore into bearing engagement with the walls of a collar 47 held in a bore by a cap 48. The cap closes the end of the bore in the projection 22$^a$ and a spring 49 seated in a recess in the cap bears against the end of the rod to urge the head 45 against the shaft and collar. The rod has flattened, diametrically located faces 50 and extends through a slot 51 in a cross stud 52 which is slidably supported by a bore 53 formed in the projection 22$^a$ to intersect the bore enlargement 38 at right angles thereto. The stud has a screw threaded stem 54 at its inner end engaging the movable guide 19$^a$ and the outer end has an axial bore 55 opening into the slot 51. The inner portion of the bore 55 adjustably supports a wedge member 56 having an angular inner end face 57 for coaction with a complementally angular face 58 formed by notching the adjacent edge of the wedge rod 46. The wedge member 56 is splined, as at 59, to the stud for endwise adjustment and its position is determined by a backing nut 60 and a lock nut 61 both screw threaded into the outer end of the bore 55.

In operation and presuming that the clamping means is engaged as shown in Fig. 1, an operator wishing to shift the position of the tailstock merely rotates the shaft 27 slightly in a clockwise direction (looking upwardly in Fig. 1) by manipulation of the handle 17. This movement causes the nibs or lugs 44 on the collar 43 to move along the cam surfaces 41 and into engagement with the notches 40 to establish a clutched driving engagement between the shaft and pinion and move the angular wedge surface 58 clear of the complemental wedge surface 57. This movement is assisted by the spring 49 which also yieldingly maintains the driving engagement. As may best be seen in Fig. 4, the interengagement of the lugs and notches will effect a rotary drive of the pinion in either direction and the side walls of the notches adjoining the high points of the cam surfaces 41 are of sufficient height to prevent overriding of the lugs.

After the tailstock has been shifted as desired by rotation of the shaft in either direction to drive the pinion along the rack 24, the tailstock may be conveniently and quickly reclamped. Thus, the operator pulls outwardly on the end of the lever 17 to swing it about its pivot 35 and shift the shaft axially a distance sfficient to move the lugs substantially clear of the low sides of the notches 40. This declutching movement is followed by a movement of the lever to rotate the shaft 27 counterclockwise (as seen in Fig. 1). The resulting travel of the lugs along the rising cam surfaces moves the wedge surface 58 into firm engagement with the surface 57, thereby drawing the movable guide 19$^a$ into binding engagement with its associated way to secure the tailstock in position. It will be evident that only rotational movement of the shaft is required to clamp and unclamp the tailstock as well as to adjust its position, the slight axial movement of the shaft being but a preliminary declutching operation preparatory to actuation of the clamping mechanism.

While the invention is susceptible of various modifications and alternative constructions, I have shown in the drawing and have herein described in detail the preferred embodiment, but it is to be understood that I do not thereby intend to limit the invention to the specific form disclosed, but intend to cover all modifications and alternative constructions falling within the spirit and scope of the invention as expressed in the appended claims.

I claim as my invention:

1. In a clamping device of the character described, in combination, a tailstock having means for shifting the position thereof including a pinion, a shaft mounted for rotational and axial movement, means on said shaft for establishing a rotary drive connection between the shaft and pinion upon an axial movement of said shaft in one direction and for interrupting said drive connection upon an opposite axial shaft movement, coacting clamping means including a movable element, and cam means for moving said element to establish or interrupt clamping engagement of said clamping means upon rotary movement of said shaft when said rotary drive connection is interrupted.

2. In a clamp for a tailstock, in combination, a rotatable and axially shiftable shaft on said tailstock, a pinion loosely mounted on said shaft, a collar fixed on said shaft adjacent to said pinion, said collar and pinion having cooperating means interengageable when said collar is moved toward said pinion by axial movement of said shaft to establish a driving connection between said shaft and pinion, means for urging said shaft in such direction, inclined cam faces on said pinion for engagement by the interengageable means on said collar to move said shaft in an opposite direction upon rotary movement of said shaft when said driving connection with said pinion is disengaged, wedge means shiftable by movement of said shaft in said opposite direction, and means engageable by the wedge means in its shifting to clamp the tailstock in place.

3. In a tailstock clamp, the combination of means for adjusting the position of the tailstock, a rotatable member, means releasable at the will of the operator for drivingly connecting said member with the adjusting means at any desired position of said tailstock, clamping means actuated by an initial rotary movement of said member in one direction to release said tailstock from a clamped relation, said releasable means being actuated by said movement in one direction to establish a driving connection between said member and said adjusting means, said driving connection thus established being operable in either direction of further rotation of said member, and means for disconnecting said driving connection and for clamping said tailstock in any desired position of adjustment upon rotary movement of said member in a direction opposite to said first mentioned direction.

4. In a clamp for a tailstock, the combination of means for shifting the position of the tailstock including a rotary shaft, relatively movable coacting wedges, means actuated by rotation of said shaft for effecting relative movement of said wedges into and out of engagement, and tailstock clamping means engageable and disengageable by such relative movement of said wedges.

5. In a clamp for a tailstock, the combination of means for shifting said tailstock, a shaft rotatable to actuate the shifting means, a disengageable driving connection between said shaft and said shifting means, means movable by said shaft for disengaging said connection at any point in the range of movement of said tailstock selected by the operator, and tailstock clamping means operable by rotation of said shaft when said driving connection has been disengaged by the operator's manipulation of said shaft at a selected point.

6. In a clamp for a tailstock, the combination of means for shifting said tailstock, a shaft rotatable to actuate the shifting means, a driving connection between said shaft and said shifting means, means controlled by the operator for disengaging said connection at any predetermined point in the travel of said tailstock, complementary wedging elements supported for relative movement into and out of a tailstock securing position, and cam means operable by said shaft when said driving connection is disengaged for effecting such relative movement of said wedging elements.

BENJAMIN R. PURVIN.